(12) United States Patent
Zhang et al.

(10) Patent No.: US 10,305,823 B2
(45) Date of Patent: May 28, 2019

(54) NETWORK INTERFACE CARD CONFIGURATION METHOD AND RESOURCE MANAGEMENT CENTER

(71) Applicant: Huawei Technologies Co., Ltd., Shenzhen, Guangdong (CN)

(72) Inventors: Chuande Zhang, Hangzhou (CN); Wenliang Wu, Hangzhou (CN); Wei Wang, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 204 days.

(21) Appl. No.: 15/581,619

(22) Filed: Apr. 28, 2017

(65) Prior Publication Data

US 2017/0228337 A1 Aug. 10, 2017

Related U.S. Application Data

(63) Continuation of application No. PCT/CN2014/090119, filed on Oct. 31, 2014.

(51) Int. Cl.
*G06F 15/173* (2006.01)
*H04L 12/861* (2013.01)
(Continued)

(52) U.S. Cl.
CPC ............ *H04L 49/90* (2013.01); *G06F 9/4405* (2013.01); *G06F 9/45558* (2013.01);
(Continued)

(58) Field of Classification Search
CPC .............. H04L 49/90; H04L 29/06176; H04L 47/783; H04L 43/50; H04L 47/10; G06F 12/084; G06F 13/1663; G06F 13/364
See application file for complete search history.

(56) References Cited

U.S. PATENT DOCUMENTS 7,937,499 B1 5/2011 Tripathi
8,677,023 B2 3/2014 Venkataraghavan et al.
(Continued)

FOREIGN PATENT DOCUMENTS

CN 102291428 A 12/2011
CN 102541803 A 7/2012
(Continued)

*Primary Examiner* — Kyung H Shin

(57) ABSTRACT

A network interface card configuration method and a resource management center are provided. According to the method, after obtaining a network interface card allocation request of an operating system that runs in a first CPU core, a resource management center selects, from M physical network interface cards and based on a network parameter of a network service required by the operating system, a target physical network interface card that conforms to the network parameter. Further, the resource management center selects at least one target hardware queue from each target physical network interface card and sends a command message to a network interface card controller. After receiving queue information of the target hardware queue from the network interface card controller, the resource management center send an instruction message to a CPU controller on a CPU board to instruct the CPU controller to construct a virtual network interface card.

18 Claims, 8 Drawing Sheets

(51) Int. Cl.

| | | |
|---|---|---|
| *G06F 13/16* | (2006.01) | |
| *H04L 12/26* | (2006.01) | |
| *G06F 12/084* | (2016.01) | |
| *H04L 12/801* | (2013.01) | |
| *H04L 12/911* | (2013.01) | |
| *G06F 13/364* | (2006.01) | |
| *H04L 12/28* | (2006.01) | |
| *H04L 12/24* | (2006.01) | |
| *G06F 9/4401* | (2018.01) | |
| *G06F 9/455* | (2018.01) | |
| *G06F 13/10* | (2006.01) | |
| *G06F 13/40* | (2006.01) | |

(52) U.S. Cl.
CPC ......... *G06F 12/084* (2013.01); *G06F 13/102* (2013.01); *G06F 13/1663* (2013.01); *G06F 13/364* (2013.01); *G06F 13/4027* (2013.01); *H04L 12/28* (2013.01); *H04L 41/0806* (2013.01); *H04L 43/50* (2013.01); *H04L 47/10* (2013.01); *H04L 47/783* (2013.01); *G06F 2009/45595* (2013.01)

(56) References Cited

U.S. PATENT DOCUMENTS

| | | | |
|---|---|---|---|
| 9,251,108 B2* | 2/2016 | Bass | G06F 13/1663 |
| 9,306,870 B1* | 4/2016 | Klein | H04L 29/06176 |
| 2008/0162800 A1 | 7/2008 | Takashige et al. | |
| 2011/0106518 A1 | 5/2011 | Shin | |
| 2011/0134793 A1 | 6/2011 | Elsen et al. | |
| 2011/0242993 A1* | 10/2011 | Gotou | H04L 43/50 370/250 |
| 2011/0314469 A1 | 12/2011 | Qian et al. | |
| 2013/0262718 A1* | 10/2013 | Vasudevan | H04L 49/90 710/54 |
| 2014/0059111 A1 | 2/2014 | Veeraiyan | |

FOREIGN PATENT DOCUMENTS

| | | |
|---|---|---|
| CN | 102609298 A | 7/2012 |
| CN | 102780642 A | 11/2012 |
| CN | 102984085 A | 3/2013 |
| CN | 103176780 A | 6/2013 |
| EP | 2398199 A1 | 12/2011 |

* cited by examiner

CONT.
FROM
FIG. 3A

| The resource management center obtains, from the preconfigured first database and based on a network segment connected by a network service required by the operating system, a network interface card ID of a target physical network interface card that matches the network segment | — 302a |

| The resource management center searches, according to the network interface card ID of the target physical network interface card, the preconfigured second database for queue information of each hardware queue in the target physical network interface card | — 303a |

| The resource management center successively selects, according to bandwidth required by the network service, at least one target hardware queue from each target physical network interface card, and obtains a queue ID of each target hardware queue from the queue information of all the hardware queues in each physical network interface card | — 303b |

| The resource management center sends a command message to a network interface card controller | — 304 |

| The resource management center receives a queue message that is of the target hardware queue and fed back by the network interface card controller according to the queue ID of each target hardware queue | — 305 |

| The resource management center sends an instruction message to a CPU controller on a CPU board | — 306 |

FIG. 3B

NETWORK INTERFACE CARD CONFIGURATION METHOD AND RESOURCE MANAGEMENT CENTER

CROSS-REFERENCE TO RELATED APPLICATIONS

This application is a continuation of International Application No. PCT/CN2014/090119, filed on Oct. 31, 2014, the disclosure of which is hereby incorporated by reference in its entirety.

TECHNICAL FIELD

The present disclosure relates to the field of multi-core processors, and in particular, to a network interface card configuration method and a resource management center.

BACKGROUND

Currently, for purpose of improving a parallel computing capability of a multi-core processor and performance of the multi-core processor, a skilled person proposes a concept of many-core decoupling, that is, in a multi-core computer system, the hardware devices such as a memory and an input/output (IO) device are decoupled, and hardware networks managed by all parts obtained after decoupling are formed, so that a high-performance computing capability of the multi-core computer system is effectively improved.

A common and typical multi-core processor system based on many-core decoupling includes independent components such as a CPU board integrating multiple central processing units (CPU), a device board integrating various IO devices, and a resource management center configured to manage all hardware resources in the system. Generally, multiple CPUs (hundreds of CPU cores) access the foregoing CPU board, and multiple operating systems (OS) may simultaneously run on the CPU board. The IO device integrated on the foregoing device board includes multiple multi-queue network interface cards, and each multi-queue network interface card includes multiple hardware queues. By means of multi-queue network interface card drive, the multi-queue network interface card can bind all hardware queues to different CPU cores by using interrupt routing. Therefore, when an operating system on the foregoing CPU board needs a network service, the resource management center allocates a part of the CPU cores and a corresponding multi-queue network interface card to the operating system, so that the multi-queue network interface card is bound to a CPU core corresponding to the operating system, thereby improving utilization of a network interface card bandwidth.

However, the inventor discovers that in a many-core decoupling architecture, after a resource management center configures a corresponding multi-queue network interface card for an operating system, the operating system cannot detect another external multi-queue network interface card, and a CPU core corresponding to the operating system is bound to two transceiver hardware queues in the multi-queue network interface card. In addition, different multi-queue network interface cards belong to different network segment, and therefore, each CPU core can process data of only a multi-queue network interface card bound to the CPU core and a network segment corresponding to the multi-queue network interface card.

SUMMARY

Embodiments of the present disclosure provide a network interface card configuration method and a resource management center, so as to resolve a problem in the prior art that a multi-core processor system based on many-core decoupling cannot implement cross-network interface card data processing and cross-network segment data processing.

To achieve the foregoing purpose, the following technical solutions are used in the embodiments of the present disclosure:

According to a first aspect, a network interface card configuration method is provided and is applied to a multi-core processor system, where the multi-core processor system includes a resource management center, a device board, and a central processing unit CPU board; the device board includes M physical network interface cards and a network interface card controller configured to control the M physical network interface cards, and the M physical network interface cards are connected to the network interface card controller; the CPU board includes multiple CPU cores and a CPU controller configured to control the CPU cores on the CPU board, where an operating system runs in a first CPU core among the multiple CPU cores, each physical network interface card includes multiple hardware queues, and the hardware queues are used to receive and transmit data that runs in CPU cores bound to the hardware queues; and the method includes:

obtaining, by the resource management center, a network interface card allocation request of the operating system that runs in the first CPU core, where the network interface card allocation request is used to request to allocate a network interface card that can provide a network service, and the network interface card allocation request includes a network parameter of the network service required by the operating system;

selecting, from the M physical network interface cards and based on the network parameter of the network service required by the operating system, a target physical network interface card that conforms to the network parameter;

separately selecting at least one target hardware queue from each target physical network interface card;

sending a command message to the network interface card controller, where the command message is used to instruct the network interface card controller to bind interrupt routing of each target hardware queue to the first CPU core in which the operating system runs, and the command message includes a queue identifier ID of each target hardware queue;

receiving queue information that is of each target hardware queue and fed back by the network interface card controller according to the queue identifier ID of the target hardware queue; and sending an instruction message to the CPU controller on the CPU board, where the instruction message includes the queue information of the target hardware queue and network interface card information that are used to construct a virtual network interface card, and the instruction message is used to instruct the CPU controller on the CPU board to generate, according to the network interface card information and the queue information that is of the target hardware queue, a virtual network interface card that can provide the network service for the operating system.

In a first possible implementation manner of the first aspect, the network parameter of the network service required by the operating system includes at least a network segment connected by the network service and bandwidth required by the network service.

With reference to the first possible implementation manner of the first aspect, in a second possible implementation manner of the first aspect, the selecting, from the M physical network interface cards and based on the network parameter of the network service required by the operating system, a target physical network interface card that conforms to the network parameter specifically includes:

obtaining, from a preconfigured first database and based on the network segment connected by the network service required by the operating system, a network interface card ID of a target physical network interface card that matches the network segment, where the first database stores a network interface card parameter of each physical network interface card in the M physical network interface cards, and the network interface card parameter includes a network segment to which the physical network interface card belongs and a network interface card ID of the physical network interface card.

With reference to the first possible implementation manner or the second possible implementation manner of the first aspect, in a third possible implementation manner of the first aspect, the separately selecting at least one target hardware queue from each target physical network interface card specifically includes:

searching, according to the network interface card ID of the target physical network interface card, a preconfigured second database for queue information of each hardware queue in the target physical network interface card, where the second database stores queue information of each hardware queue in each physical network interface card in the M physical network interface cards; and selecting, according to the bandwidth required by the network service, the at least one target hardware queue from each target physical network interface card, and obtaining a queue ID of each target hardware queue from the queue information of all the hardware queues in each physical network interface card.

With reference to the first aspect or any one of the first to the third possible implementation manners of the first aspect, in a fourth possible implementation manner of the first aspect, before the obtaining, by the resource management center, a network interface card allocation request of the operating system that runs on the CPU board, the method further includes:

receiving the network interface card parameter of each physical network interface card in the M physical network interface cards, and the queue information of a hardware queue in each physical network interface card in the M physical network interface cards, where the network interface card parameter and the queue information are sent by the network interface card controller;

allocating a corresponding network interface card ID to each physical network interface card in the M physical network interface cards; and correspondingly storing, in the first database, the network interface card parameter of each physical network interface card and the network interface card ID of each physical network interface card in the M physical network interface cards, and correspondingly storing, in the second database, the queue information of a hardware queue in each physical network interface card and the network interface card ID of each physical network interface card.

With reference to the first aspect or any one of the first to the fourth possible implementation manners of the first aspect, in a fifth possible implementation manner of the first aspect, the queue information of a hardware queue includes a queue ID of the hardware queue, a CPU core address bound to the interrupt routing, a direct memory access DMA mapping address, and a current status of the hardware queue, and the current status of the hardware queue is used to indicate whether the hardware queue is allocated.

According to a second aspect, a resource management center is provided, where the resource management center is applied to a multi-core processor system, and the multi-core processor system includes the resource management center, a device board, and a central processing unit CPU board; the device board includes M physical network interface cards and a network interface card controller configured to control the M physical network interface cards, and the M physical network interface cards are connected to the network interface card controller; the CPU board includes multiple CPU cores and a CPU controller configured to control the CPU cores on the CPU board, where an operating system runs in a first CPU core among the multiple CPU cores, each physical network interface card includes multiple hardware queues, and the hardware queues are used to receive and transmit data that runs in CPU cores bound to the hardware queues; and the resource management center includes:

an obtaining module, configured to obtain a network interface card allocation request of the operating system that runs in the first CPU core, where the network interface card allocation request is used to request to allocate a network interface card that can provide a network service, and the network interface card allocation request includes a network parameter of the network service required by the operating system;

a selection module, configured to select, from the M physical network interface cards and based on the network parameter of the network service required by the operating system, a target physical network interface card that conforms to the network parameter, where the selection module is further configured to separately select at least one target hardware queue from each target physical network interface card;

a first sending module, configured to send a command message to the network interface card controller, where the command message is used to instruct the network interface card controller to bind interrupt routing of each target hardware queue to the first CPU core in which the operating system runs, and the command message includes a queue identifier ID of each target hardware queue;

a first receiving module, configured to receive queue information that is of each target hardware queue and fed back by the network interface card controller according to the queue identifier ID of the target hardware queue; and a second sending module, configured to send an instruction message to the CPU controller on the CPU board, where the instruction message includes the queue information of the target hardware queue and network interface card information that are used to construct a virtual network interface card, and the instruction message is used to instruct the CPU controller on the CPU board to generate, according to the network interface card information and the queue information that is of the target hardware queue, a virtual network interface card that can provide the network service for the operating system.

In a first possible implementation manner of the second aspect, the network parameter of the network service required by the operating system includes at least a network segment connected by the network service and bandwidth required by the network service.

With reference to the first possible implementation manner of the second aspect, in a second possible implementation manner of the second aspect, the selection module is specifically configured to:

select, from a preconfigured first database and based on the network segment connected by the network service required by the operating system, a network interface card ID of a target physical network interface card that matches the network segment, where the first database stores a network interface card parameter of each physical network interface card in the M physical network interface cards, and the network interface card parameter includes a network segment to which the physical network interface card belongs and a network interface card ID of the physical network interface card.

With reference to the first possible implementation manner or the second possible implementation manner of the second aspect, in a third possible implementation manner of the second aspect, the selection module is specifically configured to:

search, according to the network interface card ID of the target physical network interface card, a preconfigured second database for queue information of each hardware queue in the target physical network interface card, where the second database stores queue information of each hardware queue in each physical network interface card in the M physical network interface cards; and select, according to the bandwidth required by the network service, the at least one target hardware queue from each target physical network interface card, and obtain a queue ID of each target hardware queue from the queue information of all the hardware queues in each physical network interface card.

With reference to the second aspect or any one of the first to the third possible implementation manners of the second aspect, in a fourth possible implementation manner of the second aspect, the resource management center further includes:

a second receiving module, configured to receive the network interface card parameter of each physical network interface card in the M physical network interface cards, and the queue information of a hardware queue in each physical network interface card in the M physical network interface cards, where the network interface card parameter and the queue information are sent by the network interface card controller;

an allocation module, configured to allocate a corresponding network interface card ID to each physical network interface card in the M physical network interface cards; and a storage module, configured to correspondingly store, in the first database, the network interface card parameter of each physical network interface card and the network interface card ID of each physical network interface card in the M physical network interface cards, and correspondingly store, in the second database, the queue information of a hardware queue in each physical network interface card and the network interface card ID of each physical network interface card.

With reference to the second aspect or any one of the first to the fourth possible implementation manners of the second aspect, in a fifth possible implementation manner of the second aspect, the queue information of a hardware queue includes a queue ID of the hardware queue, a CPU core address bound to the interrupt routing, a direct memory access DMA mapping address, and a current status of the hardware queue, and the current status of the hardware queue is used to indicate whether the hardware queue is allocated.

According to a third aspect, a multi-core processor system is provided, where the multi-core processor system includes a resource management center, a device board, and a central processing unit CPU board; the device board includes M physical network interface cards and a network interface card controller configured to control the M physical network interface cards, and the M physical network interface cards are connected to the network interface card controller; the CPU board includes multiple CPU cores and a CPU controller configured to control the CPU cores on the CPU board, where an operating system runs in a first CPU core among the multiple CPU cores, each physical network interface card includes multiple hardware queues, and the hardware queues are used to receive and transmit data that runs in CPU cores bound to the hardware queues;

the resource management center is configured to obtain a network interface card allocation request of the operating system that runs in the first CPU core, where the network interface card allocation request is used to request to allocate a network interface card that can provide a network service, and the network interface card allocation request includes a network parameter of the network service required by the operating system;

the resource management center is further configured to: select, from the M physical network interface cards and based on the network parameter of the network service required by the operating system, a target physical network interface card that conforms to the network parameter, and separately select at least one target hardware queue from each target physical network interface card;

the resource management center is further configured to send a command message to the network interface card controller, where the command message includes a queue identifier ID of each target hardware queue;

the network interface card controller is configured to bind, according to the command message, interrupt routing of each target hardware queue to the first CPU core in which the operating system runs;

the network interface card controller is further configured to search queue information of each target hardware queue according to the queue identifier ID of the target hardware queue;

the resource management center is further configured to receive the queue information that is of the target hardware queue and fed back by the network interface card controller;

the resource management center is further configured to send an instruction message to the CPU controller on the CPU board, where the instruction message includes the queue information of the target hardware queue and network interface card information that are used to construct a virtual network interface card; and the CPU controller on the CPU board is configured to generate, according to the queue information of the target hardware queue and the network interface card information that are in the instruction message, a virtual network interface card that can provide the network service for the operating system.

In a first possible implementation manner of the third aspect, the network parameter of the network service required by the operating system includes at least a network segment connected by the network service and bandwidth required by the network service.

With reference to the first possible implementation manner of the third aspect, in a second possible implementation manner of the third aspect, the resource management center is specifically configured to:

select, from a preconfigured first database and based on the network segment connected by the network service required by the operating system, a network interface card ID of a target physical network interface card that matches the network segment, where the first database stores a network interface card parameter of each physical network interface card in the M physical network interface cards, and the network interface card parameter includes a network segment to which the physical network interface card belongs and a network interface card ID of the physical network interface card.

With reference to the first possible implementation manner or the second possible implementation manner of the third aspect, in a third possible implementation manner of the third aspect, the resource management center is specifically configured to:

search, according to the network interface card ID of the target physical network interface card, a preconfigured second database for queue information of each hardware queue in the target physical network interface card, where the second database stores queue information of each hardware queue in each physical network interface card in the M physical network interface cards; and select, according to the bandwidth required by the network service, the at least one target hardware queue from each target physical network interface card, and obtain a queue ID of each target hardware queue from the queue information of all the hardware queues in each physical network interface card.

With reference to the third aspect or any one of the first to the third possible implementation manners of the third aspect, in a fourth possible implementation manner of the third aspect, the resource management center further configured to:

receive the network interface card parameter of each physical network interface card in the M physical network interface cards, and the queue information of a hardware queue in each physical network interface card in the M physical network interface cards, where the network interface card parameter and the queue information are sent by the network interface card controller;

allocate a corresponding network interface card ID to each physical network interface card in the M physical network interface cards; and correspondingly store, in the first database, the network interface card parameter of each physical network interface card and the network interface card ID of each physical network interface card in the M physical network interface cards, and correspondingly store, in the second database, the queue information of a hardware queue in each physical network interface card and the network interface card ID of each physical network interface card.

With reference to the third aspect or any one of the first to the fourth possible implementation manners of the third aspect, in a fifth possible implementation manner of the third aspect, the queue information of a hardware queue includes a queue ID of the hardware queue, a CPU core address bound to the interrupt routing, a direct memory access DMA mapping address, and a current status of the hardware queue, and the current status of the hardware queue is used to indicate whether the hardware queue is allocated.

According to the network interface card configuration method and the resource management center that are provided in embodiments of the present invention, the resource management center obtains a network interface card allocation request of an operating system that runs in a first CPU core, selects, from M physical network interface cards and based on a network parameter of a network service required by the operating system, a target physical network interface card that conforms to the network parameter, and separately selects at least one target hardware queue from each target physical network interface card. Then the resource management center sends a command message to a network interface card controller and receives queue information that is of the target hardware queue and fed back by the network interface card controller. Finally, the resource management center sends an instruction message to a CPU controller on a CPU board, so that the CPU controller generates, according to network interface card information and the target hardware queues, a new virtual network interface card that can provide the required network service for the operating system that runs on the CPU board. A multi-queue virtual network interface card that crosses physical network interface cards can be flexibly configured according to an operating system requirement. As a result, cross-network segment and cross-network interface card data processing are implemented, resources of multiple network segments and multiple network interface cards are fully used, and resource utilization is improved.

BRIEF DESCRIPTION OF THE DRAWINGS

To describe the technical solutions in the embodiments of the present disclosure or in the prior art more clearly, the following briefly introduces the accompanying drawings required for describing the embodiments. Apparently, the accompanying drawings in the following description show merely some embodiments of the present disclosure.

FIG. 3A and FIG. 3B is a schematic flowchart of another network interface card configuration method according to an embodiment;

DETAILED DESCRIPTION

The following clearly describes the technical solutions in the embodiments of the present disclosure with reference to the accompanying drawings. Apparently, the described embodiments are merely some but not all of the embodiments.

Figure 1:
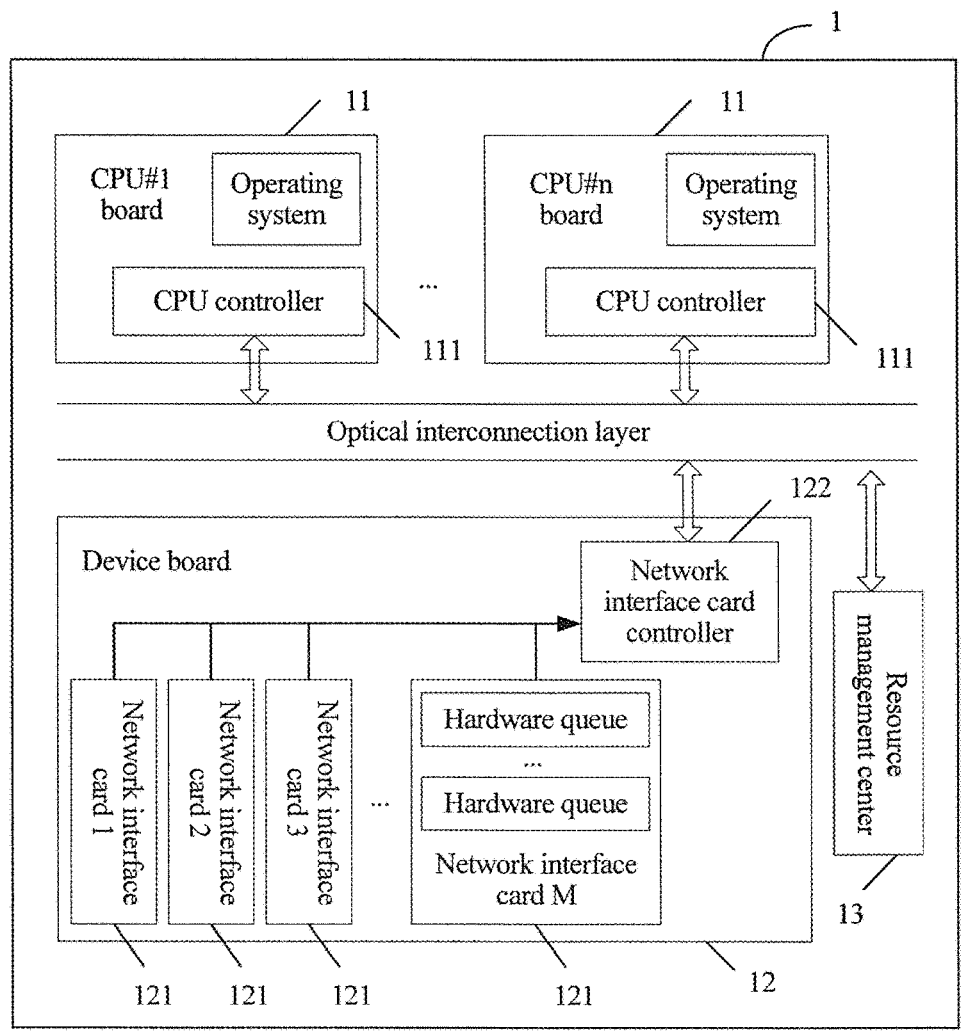
FIG. 1 is a schematic structural diagram of a multi-core processor system according to an embodiment.

A system architecture of a multi-core processor system based on many-core decoupling and applied in the embodiments of the present invention is shown in FIG. 1. A many-core decoupling architecture refers to separating existing hardware in a computer to form hardware networks managed by all parts obtained after decoupling, that is, decoupling the hardware in the computer into parts such as a computing resource pool, an input/output (IO) device pool, a memory pool, a connection network, and a resource management center. Specifically, in a computing resource pool of a multi-core processor system 1 corresponding to FIG. 1, that is, a CPU resource pool that includes multiple CPU boards 11 in FIG. 1 (for example, a CPU#1 board, a CPU#2 board, . . . , and a CPU#n board in the FIG. 1. Each CPU board 11 includes multiple CPU cores), the CPU boards 11 include multiple CPU cores. An operating system runs in a first CPU core among the foregoing multiple CPU cores. These CPU cores may be integrated on one CPU board 11 or integrated on multiple CPU boards 11. An IO device pool of the multi-core processor system 1 is a device board 12 in FIG. 1, and multiple IO devices (for example, a disk, a network interface card, a video graphics array (VGA) video card) are integrated on the device board 12. Specifically, M physical network interface cards 121 (for example, a network interface card 1, a network interface card 2, ... , and a network interface card M in FIG. 1) are integrated on the device board 12, the foregoing physical network interface cards 121 are multi-queue network interface cards, each multi-queue network interface card includes multiple hardware queues, and the foregoing hardware queues are used to receive and transmit data run in CPU cores bound to the hardware queues. It should be noted that, each board in the multi-core processor system 1 is integrated with a controller (for example, a cloud controller) configured to control hardware resources on the board, for example, a CPU controller 111 configured to control all CPU cores on the CPU board 11, and a network interface card controller 122 configured to control physical network interface cards 121 on the device board. In addition, a resource management center 13 in the multi-core processor system 1 controls allocation and interconnection of hardware resources by using the controller on each board, so as to manage all hardware resources in the multi-core processor system 1.

In the prior art, when a running operating system in the multi-core processor system 1 makes a network service request, the resource management center 13 selects a part of the CPU cores from the CPU boards 11, selects a segment of memory from a memory pool, selects several IO devices from the IO device board 12, and then connects the selected parts by using the controller on each board, and isolates the connected parts from another part, so as to form a complete small computer. However, multiple operating systems simultaneously run on the CPU boards 11 in the multi-core processor system 1, and each operating system requests for a different network requirement. Therefore, the resource management center 13 allocates a different hardware resource to each operating system. As a result, hardware protection isolation exists between the operating systems. In this way, after the resource management center configures a physical network interface card for an operating system, the operating system cannot detect another physical network interface card. In addition, different physical network interface cards belong to different network segments. Therefore, each CPU core can process data of only a physical network interface card bound to the CPU core and a network segment corresponding to the physical network interface card. Based on the foregoing content, the embodiments of the present invention provide a new network interface card configuration method.

Figure 2:
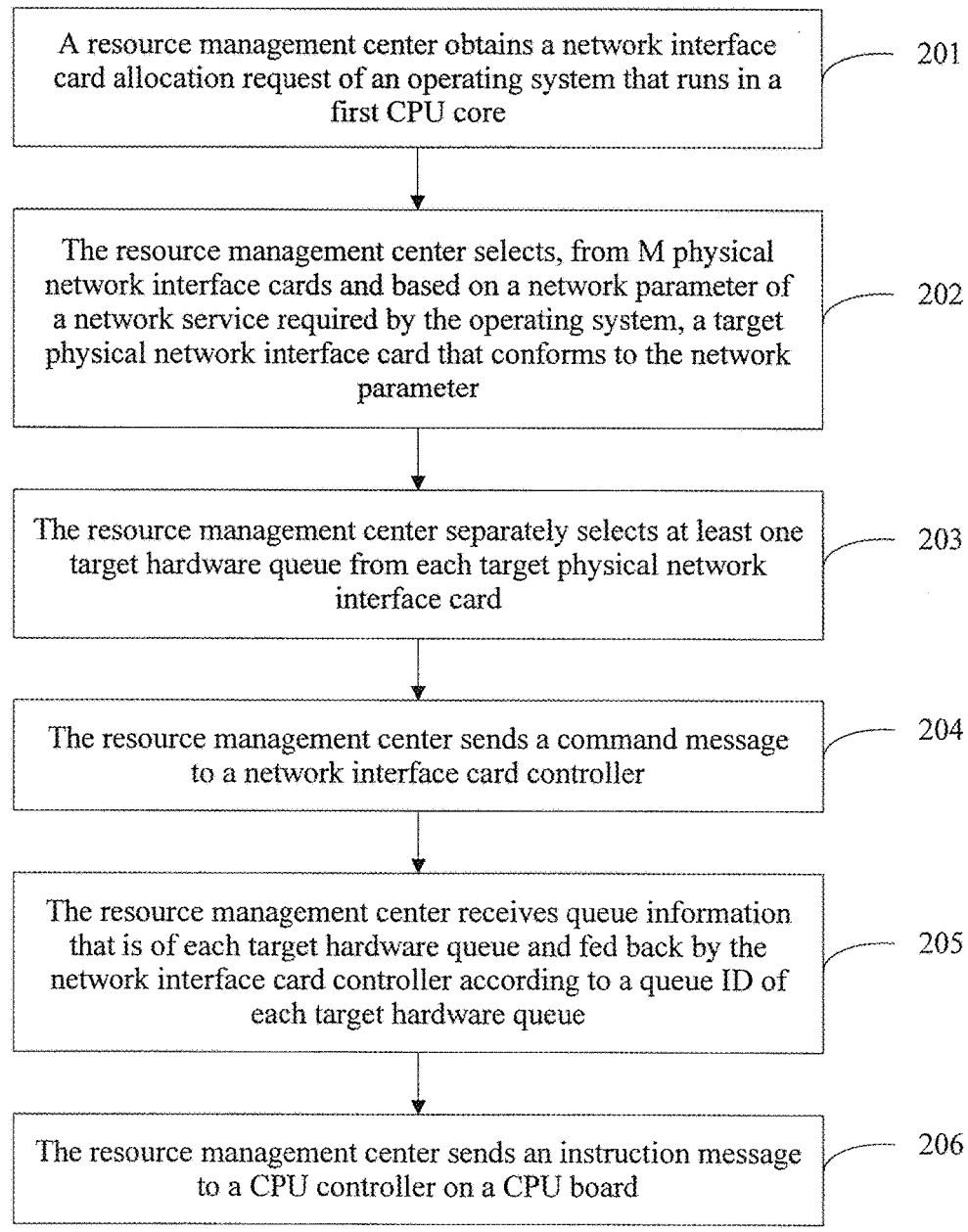
FIG. 2 is a schematic flowchart of a network interface card configuration method according to an embodiment.

Based on the multi-core processor system shown in FIG. 1, an embodiment of the present invention provides a network interface card configuration method, and as shown in FIG. 2, the method specifically includes the following steps.

201. A resource management center obtains a network interface card allocation request of an operating system that runs in a first CPU core.

The foregoing first CPU core is any core on any CPU board (for example, a CPU#1 board) in FIG. 1, the foregoing network interface card allocation request includes a network parameter of a network service required by the operating system that runs in the first CPU core, and the network parameter of the network service is used to request a network interface card that can provide the required network service. The foregoing network parameter of the network service includes at least a network segment connected by the network service and bandwidth required by the network service. A network segment that needs to be connected by the operating system may be multiple network segments, that is, the operating system needs to be simultaneously connected to multiple network segments.

It should be noted that multiple operating systems simultaneously run on a CPU board in the multi-core processor system, and each operating system requests for a different network requirement. Therefore, the resource management center needs to customize different virtual network interface cards.

202. The resource management center selects, from M physical network interface cards and based on a network parameter of a network service required by the operating system, a target physical network interface card that conforms to the network parameter.

Exemplarily, the resource management center may match, according to a network segment connected by a network service required by an operating system X, the network segment to a network segment of each physical network interface card in the M physical network interface cards, so as to obtain at least one target physical network interface card that matches the network segment.

203. The resource management center separately selects at least one target hardware queue from each target physical network interface card.

Exemplarily, the resource management center may select, according to bandwidth or a data traffic volume required by the network service required by the operating system X, one or more target hardware queues from hardware queues of each obtained target physical network interface card, and obtain a queue identifier ID of each hardware queue of the at least one target hardware queue.

204. The resource management center sends a command message to a network interface card controller.

The foregoing command message includes the queue ID of each target hardware queue, and is used to instruct the network interface card controller to bind interrupt routing of each target hardware queue to the first CPU core on the CPU board. Specifically, after the resource management center obtains a queue ID of a target hardware queue used to form a virtual network interface card required by the operating system, the resource management center sends the command message to the network interface card controller, so as to instruct the network interface card controller to unbind each target hardware queue from a CPU core that is currently bound to the target hardware queue, and then bind each target hardware queue to the first CPU core. In addition, the resource management center marks, in a database, that the target hardware queues are allocated, and in addition, the resource management center modifies queue information that is of the target hardware queues and stored in the database and modifies queue statuses of the target hardware queues into "allocated".

205. The resource management center receives queue information that is of each target hardware queue and fed back by the network interface card controller according to a queue ID of the target hardware queue.

The foregoing queue information of each hardware queue includes a queue ID of the hardware queue, a CPU core address bound to the interrupt routing, a direct memory access (DMA) mapping address, and a current status of the hardware queue, and the foregoing current status of the hardware queue indicates whether the hardware queue is allocated.

206. The resource management center sends an instruction message to a CPU controller on a CPU board.

The foregoing instruction message includes the queue information of the target hardware queue and network interface card information that are used to construct a virtual network interface card, and the instruction message is used to instruct the CPU controller on the CPU board to generate, according to the network interface card information and the queue information that is of the target hardware queue, the virtual network interface card that can provide the network service for the operating system.

Specifically, after receiving the queue information that is of the target hardware queue and sent by the network interface card controller, the resource management center first sends, to the CPU controller on the CPU board, the network interface card information used to construct the virtual network interface card. After the CPU controller constructs an architecture of the virtual network interface card according to the network interface card information of the virtual network interface card, the resource management center sends the received queue information of all the target hardware queues to the CPU controller, so that the CPU controller generates, according to all the target hardware queues, the virtual network interface card that provides the network service for the operating system. A function of cross-network interface card and cross-network segment data processing can be provided by the virtual network.

It should be noted that after the CPU controller generates, according to the target hardware queues, a new virtual network interface card, the CPU controller establishes an IO channel to the network interface card controller that controls the M physical network interface cards, and the IO channel is used to forward a data packet received by these target hardware queues.

According to the network interface card configuration method provided in this embodiment of the present invention, a resource management center obtains a network interface card allocation request of an operating system that runs in a first CPU core, selects, from M physical network interface cards and based on a network parameter of a network service required by the operating system, a target physical network interface card that conforms to the network parameter, and separately selects at least one target hardware queue from each target physical network interface card. Then the resource management center sends a command message to a network interface card controller and receives queue information that is of the target hardware queue and fed back by the network interface card controller. Finally, the resource management center sends an instruction message to a CPU controller on a CPU board, so that the CPU controller generates, according to the network interface card information and the target hardware queues, a new virtual network interface card that can provide the required network service for the operating system that runs on the CPU board. A multi-queue virtual network interface card that crosses physical network interface cards can be flexibly configured according to an operating system requirement. As a result, cross-network segment and cross-network interface card data processing are implemented, resources of multiple network segments and multiple network interface cards are fully used, and resource utilization is improved.

Embodiment 2

Figure 3A:
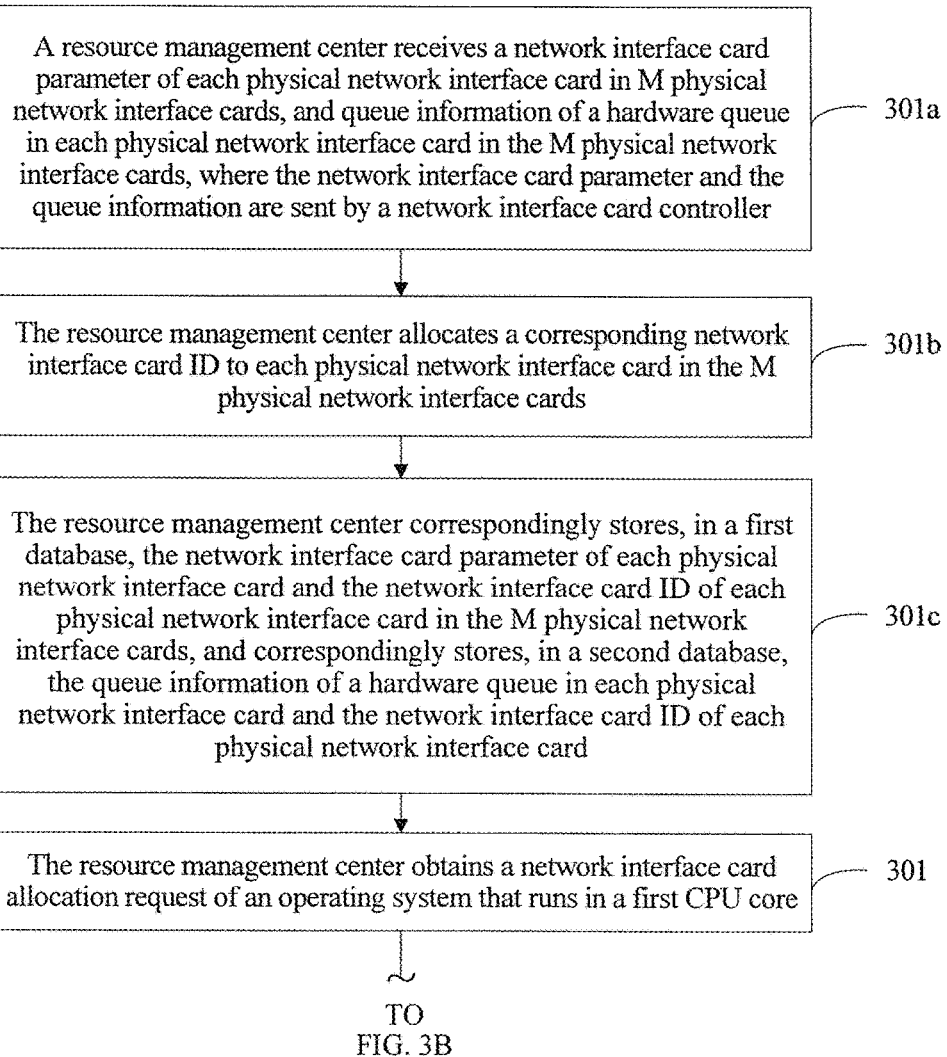

Embodiment 2 provides another network interface card configuration method, and as shown in FIG. 3A and FIG. 3B, the method specifically includes the following steps.

301. A resource management center obtains a network interface card allocation request of an operating system that runs in a first CPU core.

Specifically, before the resource management center executes the method provided in this embodiment, the resource management center further needs to obtain device information of all CPU cores and all device information (for example, network interface card parameters of all physical network interface cards on a device board, for example, a network segment connected by a network interface card, bandwidth, and a network interface card feature) on the device board, and needs to establish a database (for example, a device resource pool) before implementing the method of this embodiment for the first time or each time.

Optionally, before step 301, the method further includes the following steps:

301a. The resource management center receives a network interface card parameter of each physical network interface card in M physical network interface cards, and queue information of a hardware queue in each physical network interface card in the M physical network interface cards, where the network interface card parameter and the queue information are sent by a network interface card controller.

The foregoing network interface card parameter of each physical network interface card includes a network segment to which the physical network interface card belongs, bandwidth required by the physical network interface card, a network interface card ID of the physical network interface card, a hardware queue number N, and a queue ID of a to-be-allocated hardware queue.

The foregoing queue information of a hardware queue includes a queue ID of the hardware queue, a CPU core address bound to interrupt routing, a DMA mapping address, and a current status of the hardware queue, and the current status of the hardware queue indicates whether the hardware queue is allocated.

301b. The resource management center allocates a corresponding network interface card ID to each physical network interface card in the M physical network interface cards.

301c. The resource management center correspondingly stores, in a first database, the network interface card parameter of each physical network interface card and the network interface card ID of each physical network interface card in the M physical network interface cards, and correspondingly stores, in a second database, the queue information of a hardware queue in each physical network interface card and the network interface card ID of each physical network interface card.

Specifically, the foregoing first database may be referred to as a network interface card database and is used to store a network interface card parameter of a related physical network interface card. The foregoing second database may be referred to as a queue database and is used to store queue information of a hardware queue in related physical network interface card. In addition, it should be noted that the first database and the second database that are described in this embodiment may be a same database.

302. The resource management center selects, from the M physical network interface cards and based on a network parameter of a network service required by the operating system, a target physical network interface card that conforms to the network parameter.

Optionally, step 302 specifically includes the following steps.

302*a*. The resource management center obtains, from the preconfigured first database and based on a network segment connected by the network service required by the operating system, a network interface card ID of a target physical network interface card that matches the network segment.

The foregoing first database stores at least the network interface card parameter of each physical network interface card in the M physical network interface cards. The network interface card parameter includes a network segment to which the physical network interface card belongs and a network interface card ID of the physical network interface card. Exemplarily, if network segments connected by a network service required by an operating system X are a network segment 1, a network segment 2, and a network segment 3, the resource management center matches each of the network segment 1, the network segment 2, and the network segment 3 to the network segments that are stored in the first database and to which the M physical network interface cards belong, so as to obtain a network interface card A, a network interface card B, and a network interface card C that respectively belong to the network segment 1, the network segment 2, and the network segment 3.

303. The resource management center separately selects at least one target hardware queue from each target physical network interface card.

Optionally, step 303 specifically includes the following steps.

303*a*. The resource management center searches, according to the network interface card ID of the target physical network interface card, the preconfigured second database for queue information of each hardware queue in the target physical network interface card.

The foregoing second database stores at least the queue information of each hardware queue of each physical network interface card in the M physical network interface cards.

303*b*. The resource management center selects, according to bandwidth required by the network service, the at least one target hardware queue from each target physical network interface card, and obtains a queue ID of each target hardware queue from the queue information of all the hardware queues in each physical network interface card.

Exemplarily, the resource management center selects, according to bandwidth required by the network service required by the operating system X or a data traffic volume of the network service required by the operating system X, a corresponding quantity of target hardware queues from each obtained target physical network interface card. For example, if target physical network interface cards are the network interface card A, the network interface card B, and the network interface card C, and the bandwidth required by the operating system X is small, the resource management center selects, from each of the network interface card A, the network interface card B, and the network interface card C, any hardware queue as the target hardware queue, and obtains the queue ID of each target hardware queue from the queue information of all hardware queues in each physical network interface card, so as to form a new virtual network interface card that can cross network segments and cross physical network interface cards.

304. The resource management center sends a command message to a network interface card controller.

305. The resource management center receives a queue information that is of the target hardware queue and fed back by the network interface card controller according to the queue ID of each target hardware queue.

306. The resource management center sends an instruction message to a CPU controller on a CPU board.

Specifically, for detailed process of each step in step 301 to step 306 herein, reference may be made to step 201 to step 206 in Embodiment 1, and details are not described in this embodiment of the present invention.

Exemplarily, specific description is provided herein by applying Embodiment 2 to the multi-core processor system shown in FIG. 1.

Specifically, referring to the schematic diagram of the multi-core processor system shown in FIG. 1, the multi-core processor system includes: N central processing unit CPU boards 11, that is, a CPU#1 board, a CPU#2 board, . . . , and a CPU #n board, three physical network interface cards 121, that is, a network interface card 1, a network interface card 2, and a network interface card 3, and a resource management center 13. In an architecture of the multi-core processor system, if an operating system X that runs on the CPU#1 board is used as an example, a quantity of the physical network interface cards 121 is three, and each physical network interface card 121 includes Y hardware queues, a specific implementation process of a method provided in this embodiment is as follows:

(1). All devices in the multi-core processor system perform initialization.

The resource management center obtains information about operating systems and programs that run on all CPU boards, a to-be-run task, and all device information on a device board, such as network interface card parameters of all physical network interface cards on the device board, for example, a network segment connected by a network interface card, bandwidth, and a network interface card feature. In addition, a device resource pool is established before the method provided in this embodiment is executed for the first time.

(2). The resource management center obtains, for the operating system X, a hardware queue used to form a network interface card required by the operating system.

Specifically, when the operating system X (for example, LINUX) that runs in a first CPU core on the CPU#1 board needs a network service, the resource management center obtains a network interface card allocation request that is of the operating system X and that includes network parameters such as a network service priority, a connected network segment, and bandwidth. After obtaining the network interface card allocation request, the resource management center matches, to network segments that are in the first database and to which all physical network interface cards stored belong, a network segment 1, a network segment 2, and a network segment 3 that need to be connected by the network service required by the operating system X, so as to obtain target physical network interface cards (for example, a network interface card A, a network interface card B, and a network interface card C) that separately match the network segment 1, the network segment 2, and the network segment 3 that need to be connected by the network service required by the operating system X, and obtain network interface card IDs corresponding to target physical network interface cards. Then the resource management center searches the second database for queue information (for example, information such as a queue ID, a CPU core address bound to interrupt routing, a DMA mapping address, and a current status of a hardware queue) of each hardware queue in the network interface card A, the network interface card B, and the network interface card C; selects, according to the data traffic volume required by the network service required by the operating system X, two hardware queues, A1 and A2, from the network interface card A and a B1 hardware queue and a C1 hardware queue respectively from the network interface card B and the network interface card C; and obtains a queue ID of each target hardware queue from the queue information of all hardware queues. Finally, the resource management center sends the queue IDs of the four hardware queues, A1, A2, B1, and C1, to a network interface card controller, and the network interface card controller feeds back queue information corresponding to the four hardware queues, so that the resource management center sends the queue information corresponding to the four hardware queues to a CPU controller on the CPU#1 board.

(3). A CPU controller on the CPU#1 board integrates network interface card information and queue information into a virtual network interface card.

Figure 4:
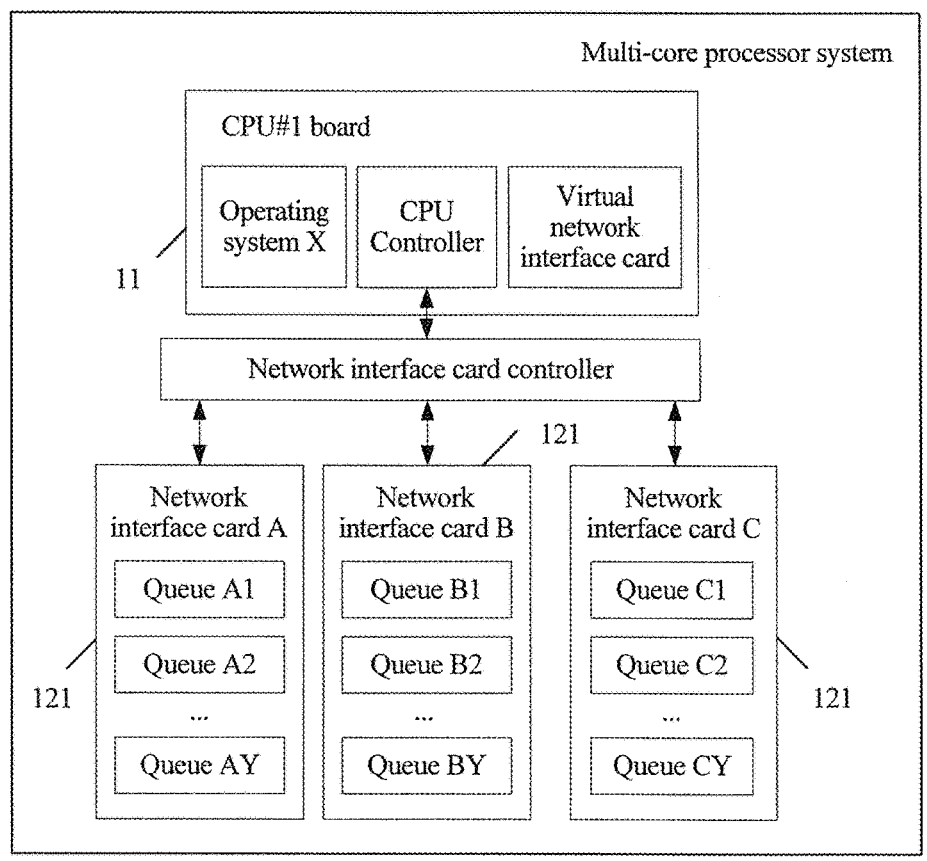
FIG. 4 is a schematic structural diagram of a multi-core processor system according to an embodiment.

Specifically, as shown in FIG. 4, after receiving the queue information of the four hardware queues, A1, A2, B1, and C1, the resource management center sends, to the CPU controller on the CPU#1 board, network interface card information used to construct the virtual network interface card. The CPU controller constructs an architecture of the virtual network interface card according to the network interface card information. Then the resource management center sends the queue information of the four hardware queues, A1, A2, B1, and C1, to the CPU controller. After applying for a segment of memory space, the CPU controller integrates the four hardware queues and the architecture of the virtual network interface card into the virtual network interface card that can provide the network service for the operating system X. After the virtual network interface card is constructed, the CPU controller on the CPU#1 board establishes an IO channel to the network interface card controller, so that the network interface card controller can send, by using the IO channel, a data packet received by the four hardware queues to the CPU core corresponding to the operating system X on the CPU#1 board.

According to the network interface card configuration method provided in this embodiment of the present invention, a resource management center obtains a network interface card allocation request of an operating system that runs in a first CPU core, selects, from M physical network interface cards and based on a network parameter of a network service required by the operating system, a target physical network interface card that conforms to the network parameter, and separately selects at least one target hardware queue from each target physical network interface card. Then the resource management center sends a command message to a network interface card controller and receives queue information that is of the target hardware queue and fed back by the network interface card controller. Finally, the resource management center sends an instruction message to a CPU controller on a CPU board, so that the CPU controller generates, according to the network interface card information and the target hardware queues, a new virtual network interface card that can provide the required network service for the operating system that runs on the CPU board. A multi-queue virtual network interface card that crosses physical network interface cards can be flexibly configured according to an operating system requirement. As a result, cross-network segment and cross-network interface card data processing are implemented, resources of multiple network segments and multiple network interface cards are fully used, and resource utilization is improved.

Embodiment 3

Figure 5:
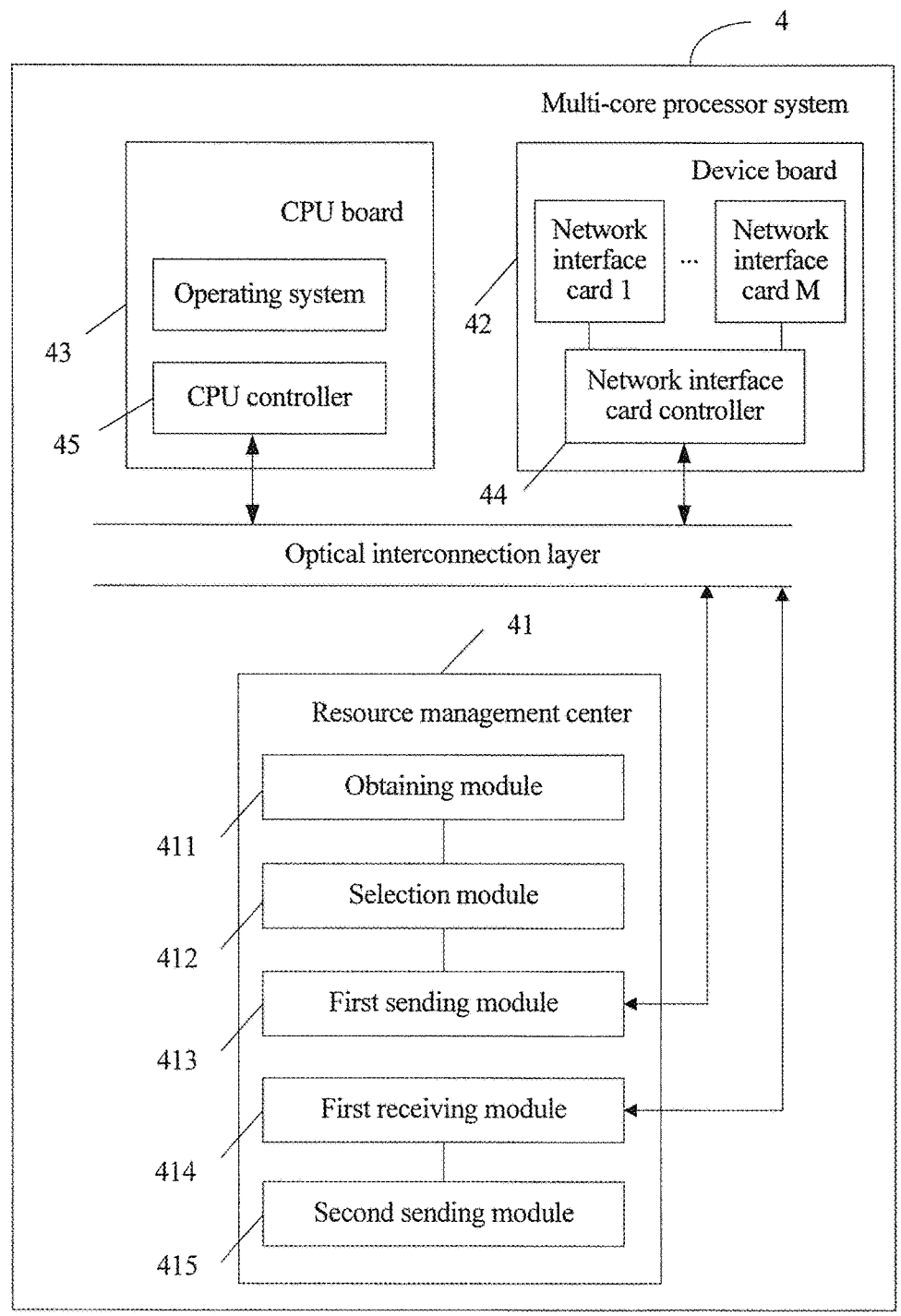
FIG. 5 is a schematic structural diagram of a multi-core processor system according to an embodiment.

This embodiment provides a resource management center, and the resource management center is applied to a multi-core processor system. As shown in FIG. 5, the multi-core processor system 4 includes: a resource management center 41, a device board 42, and a central processing unit CPU board 43. The device board 42 includes M physical network interface cards and a network interface card controller 44 configured to control the M physical network interface cards, and the M physical network interface cards are connected to the network interface card controller 44. The CPU board 43 includes multiple CPU cores and a CPU controller 45 configured to control the CPU cores on the CPU board 43. An operating system runs in a first CPU core among the foregoing multiple CPU cores, each physical network interface card includes multiple hardware queues, and the hardware queues are used to receive and transmit data that runs in CPU cores bound to the hardware queues.

Specifically, the resource management center 41 includes: an obtaining module 411, a selection module 412, a first sending module 413, a first receiving module 414, and a second sending module 415.

The obtaining module 411 is configured to obtain a network interface card allocation request of the operating system that runs in the first CPU core, where the foregoing network interface card allocation request is used to request to allocate a network interface card that can provide a network service, and the network interface card allocation request includes a network parameter of the network service required by the operating system.

The selection module 412 is configured to select, from the M physical network interface cards and based on the foregoing network parameter of the network service required by the operating system, a target physical network interface card that conforms to the network parameter.

The foregoing selection module 412 is further configured to separately select at least one target hardware queue from each target physical network interface card.

The first sending module 413 is configured to send a command message to the network interface card controller 44, where the foregoing command message is used to instruct the network interface card controller 44 to bind interrupt routing of each target hardware queue to the first CPU core in which the operating system runs, and the command message includes a queue identifier ID of each target hardware queue.

The first receiving module 414 is configured to receive queue information that is of each target hardware queue and fed back by the foregoing network interface card controller 44 according to the queue identifier ID of the target hardware queue.

The second sending module 415 is configured to send an instruction message to the CPU controller 45 on the CPU board 43, where the foregoing instruction message includes the queue information of the target hardware queue and network interface card information that are used to construct a virtual network interface card, and the instruction message is used to instruct the CPU controller 45 on the CPU board 43 to generate, according to the network interface card information and the queue information that is of the target hardware queue, a virtual network interface card that can provide the network service for the operating system.

Optionally, the foregoing network parameter of the network service required by the operating system includes at least a network segment connected by the network service and bandwidth required by the network service.

Optionally, the foregoing selection module 412 is specifically configured to:

select, from a preconfigured first database and based on the network segment connected by the network service required by the operating system, a network interface card ID of a target physical network interface card that matches the foregoing network segment, where the first database stores a network interface card parameter of each physical network interface card in the M physical network interface cards, and the network interface card parameter includes a network segment to which the physical network interface card belongs and a network interface card ID of the physical network interface card.

Optionally, the foregoing selection module 412 is specifically configured to:

search, according to the network interface card ID of the target physical network interface card, a preconfigured second database for queue information of each hardware queue in the target physical network interface card, where the second database stores queue information of each hardware queue in each physical network interface card in the M physical network interface cards; and select, according to the bandwidth required by the network service, the at least one target hardware queue from each target physical network interface card, and obtain a queue ID of each target hardware queue from the queue information of all the hardware queues in each physical network interface card.

Figure 6:
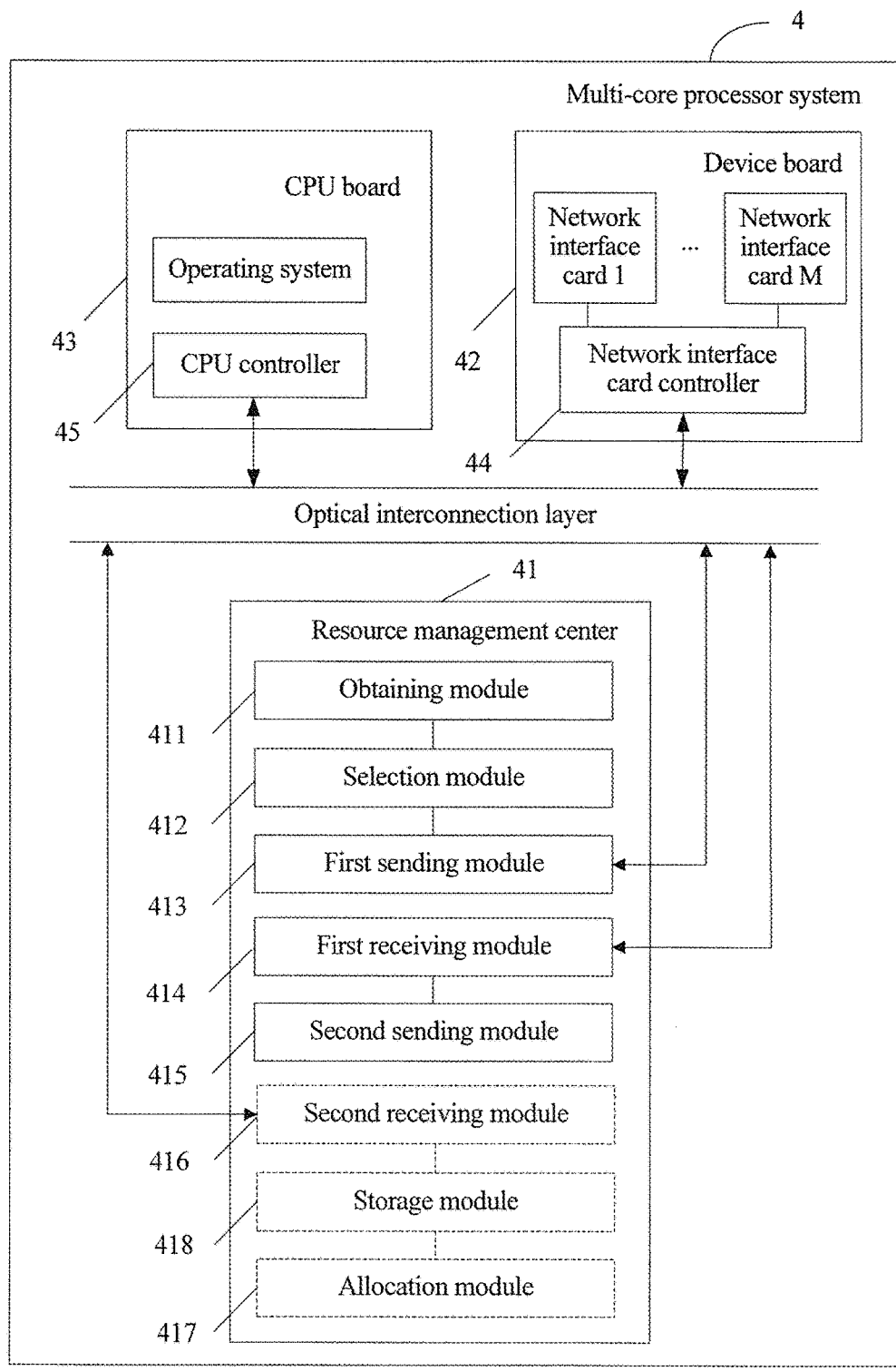
FIG. 6 is a schematic structural diagram of another multi-core processor system according to an embodiment.

Optionally, as shown in FIG. 6, the resource management center further includes: a second receiving module 416, an allocation module 417, and a storage module 418.

The second receiving module 416 is configured to receive the network interface card parameter of each physical network interface card in the M physical network interface cards, and the queue information of a hardware queue in each physical network interface card in the M physical network interface cards, where the network interface card parameter and the queue information are sent by the network interface card controller 44.

The allocation module 417 is configured to allocate a corresponding network interface card ID to each physical network interface card in the M physical network interface cards.

The storage module 418 is configured to correspondingly store, in the first database, the network interface card parameter of each physical network interface card and the network interface card ID of each physical network interface card in the M physical network interface cards, and correspondingly store, in the second database, the queue information of a hardware queue in each physical network interface card and the network interface card ID of each physical network interface card.

Optionally, the foregoing queue information of a hardware queue includes a queue ID of the hardware queue, a CPU core address bound to the interrupt routing, a direct memory access DMA mapping address, and a current status of the hardware queue, and the foregoing current status of the hardware queue indicates whether the hardware queue is allocated.

According to the resource management center in a multi-core processor system provided in this embodiment of the present invention, the resource management center obtains a network interface card allocation request of an operating system that runs in a first CPU core, selects, from M physical network interface cards and based on a network parameter of a network service required by the operating system, a target physical network interface card that conforms to the network parameter, and separately selects at least one target hardware queue from each target physical network interface card. Then the resource management center sends a command message to a network interface card controller and receives queue information that is of the target hardware queue and fed back by the network interface card controller. Finally, the resource management center sends an instruction message to a CPU controller on a CPU board, so that the CPU controller generates, according to the network interface card information and the target hardware queues, a new virtual network interface card that can provide the required network service for the operating system that runs on the CPU board. A multi-queue virtual network interface card that crosses physical network interface cards can be flexibly configured according to an operating system requirement. As a result, cross-network segment and cross-network interface card data processing are implemented, resources of multiple network segments and multiple network interface cards are fully used, and resource utilization is improved.

Embodiment 4

Figure 7:
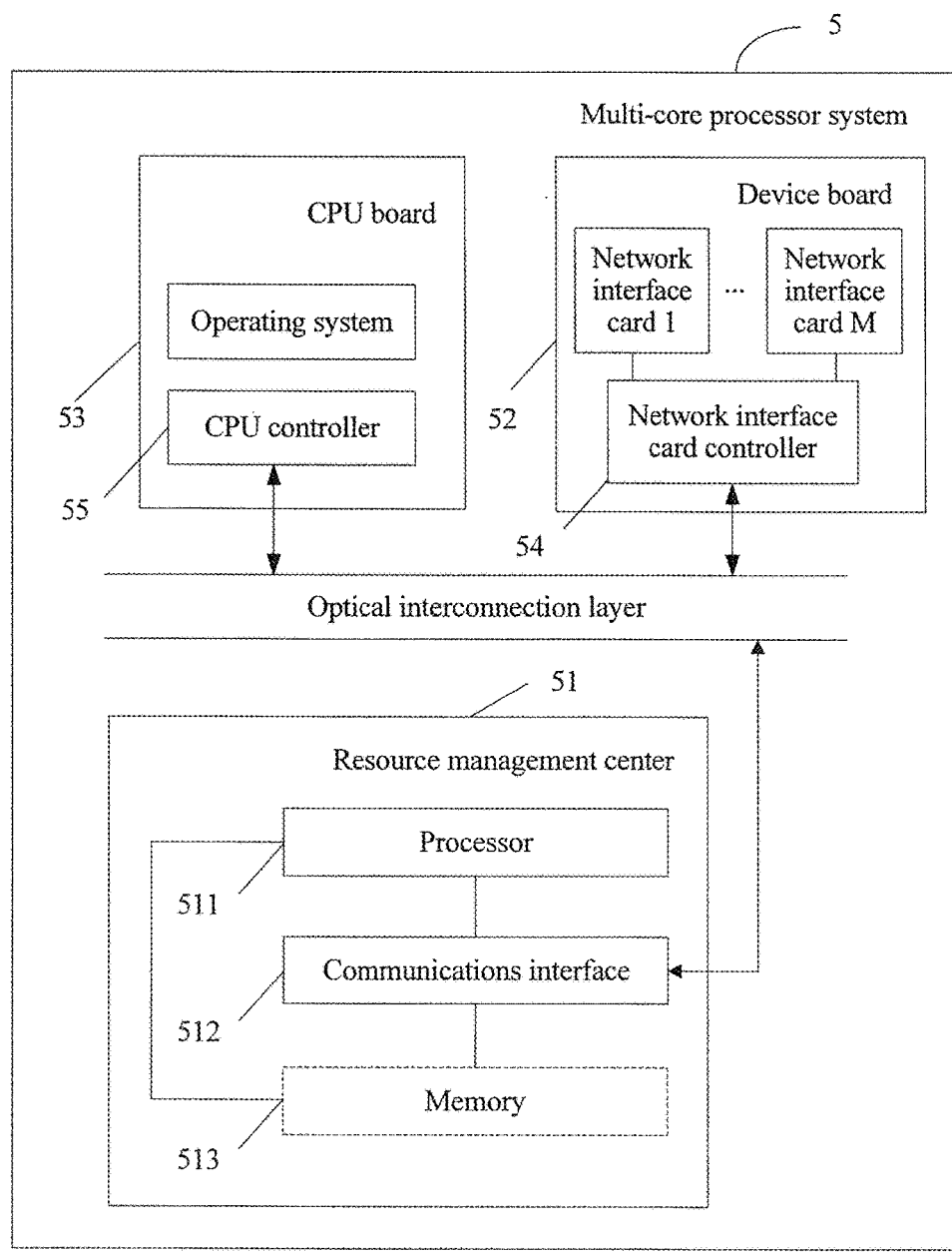
FIG. 7 is a schematic structural diagram of still another multi-core processor system according to an embodiment.

This embodiment provides a resource management center, and the resource management center is applied to a multi-core processor system. As shown in FIG. 7, the multi-core processor system 5 includes: a resource management center 51, a device board 52, and a central processing unit CPU board 53. The device board 52 includes M physical network interface cards and a network interface card controller 54 configured to control the M physical network interface cards, and the M physical network interface cards are connected to the network interface card controller. The CPU board 53 includes multiple CPU cores and a CPU controller 55 configured to control the CPU cores on the CPU board 53. An operating system runs in a first CPU core among the foregoing multiple CPU cores, each physical network interface card includes multiple hardware queues, and the hardware queues are used to receive and transmit data that runs in CPU cores bound to the hardware queues.

Specifically, the resource management center 51 includes a processor 511 and a communications interface 512.

The processor 511 is configured to obtain a network interface card allocation request of the operating system that runs in the first CPU core, where the network interface card allocation request is used to request to allocate a network interface card that can provide a network service, and the network interface card allocation request includes a network parameter of the network service required by the operating system.

The processor 511 is further configured to select, from M physical network interface cards and based on the network parameter of the network service required by the operating system, a target physical network interface card that conforms to the network parameter.

The processor 511 is further configured to separately select at least one target hardware queue from each target physical network interface card.

The processor 511 is configured to send a command message to the network interface card controller 54 by using the communications interface 512, where the command message is used to instruct the network interface card controller to bind interrupt routing of each target hardware queue to the first CPU core in which the operating system runs, and the command message includes a queue identifier ID of each target hardware queue.

The processor 511 is further configured to receive, by using the communications interface 512, queue information that is of each target hardware queue and fed back by the network interface card controller 54 according to the queue identifier ID of the target hardware queue.

The processor 511 is further configured to send an instruction message to the CPU controller 55 on the CPU board 53 by using the communications interface 512, where the foregoing instruction message includes the queue information of the target hardware queue and network interface card information that are used to construct a virtual network interface card, and the instruction message is used to instruct the CPU controller 55 on the CPU board 53 to generate, according to the network interface card information and the queue information that is of the target hardware queue, a virtual network interface card that can provide the network service for the operating system.

Optionally, the foregoing network parameter of the network service required by the operating system includes at least a network segment connected by the network service and bandwidth required by the network service.

Optionally, the processor 511 is specifically configured to: select, from a preconfigured first database and based on the network segment connected by the network service required by the operating system, a network interface card ID of a target physical network interface card that matches the network segment, where the first database stores a network interface card parameter of each physical network interface card in the M physical network interface cards, and the network interface card parameter includes a network segment to which the physical network interface card belongs and a network interface card ID of the physical network interface card.

Optionally, the processor 511 is specifically configured to:
search, according to the foregoing network interface card ID of the target physical network interface card, a preconfigured second database for queue information of each hardware queue in the target physical network interface card, where the second database stores queue information of each hardware queue in each physical network interface card in the M physical network interface cards; and select, according to the bandwidth required by the network service, the at least one target hardware queue from each target physical network interface card, and obtain a queue ID of each target hardware queue from the queue information of all the hardware queues in each physical network interface card.

Optionally, as sown in FIG. 7, the resource management center further includes a memory 513.

The processor 511 is further configured to receive, by using the communications interface 512, the network interface card parameter of each physical network interface card in the M physical network interface cards, and the queue information of a hardware queue in each physical network interface card in the M physical network interface cards, where the network interface card parameter and the queue information are sent by the network interface card controller 54.

The processor 511 is further configured to allocate a corresponding network interface card ID to each physical network interface card in the M physical network interface cards.

The memory 513 is configured to correspondingly store, in the first database, the network interface card parameter of each physical network interface card and the network interface card ID of each physical network interface card in the M physical network interface cards, and correspondingly store, in the second database, the queue information of a hardware queue in each physical network interface card and the network interface card ID of each physical network interface card.

Optionally, the foregoing queue information of a hardware queue includes a queue ID of the hardware queue, a CPU core address bound to the interrupt routing, a direct memory access DMA mapping address, and a current status of the hardware queue, and the foregoing current status of the hardware queue indicates whether the hardware queue is allocated.

According to the resource management center in a multi-core processor system provided in this embodiment of the present invention, the resource management center obtains a network interface card allocation request of an operating system that runs in a first CPU core, selects, from M physical network interface cards and based on a network parameter of a network service required by the operating system, a target physical network interface card that conforms to the network parameter, and separately selects at least one target hardware queue from each target physical network interface card. Then the resource management center sends a command message to a network interface card controller and receives queue information that is of the target hardware queue and fed back by the network interface card controller. Finally, the resource management center sends an instruction message to a CPU controller on a CPU board, so that the CPU controller generates, according to the network interface card information and the target hardware queues, a new virtual network interface card that can provide the required network service for the operating system that runs on the CPU board. A multi-queue virtual network interface card that crosses physical network interface cards can be flexibly configured according to an operating system requirement. As a result, cross-network segment and cross-network interface card data processing are implemented, resources of multiple network segments and multiple network interface cards are fully used, and resource utilization is improved.

Embodiment 5

This embodiment provides a multi-core processor system 1. As shown in FIG. 1, the multi-core processor system 1 includes a resource management center 13, a device board 12, and a central processing unit CPU board 11. The device board 12 includes M physical network interface cards 121 and a network interface card controller 122 configured to control the M physical network interface cards, and the M physical network interface cards 121 are connected to the network interface card controller 122. The CPU board 11 includes multiple CPU cores and a CPU controller 111 configured to control the CPU cores on the CPU board 11. An operating system runs in a first CPU core among the foregoing multiple CPU cores, each physical network interface card 121 includes multiple hardware queues, and the hardware queues are used to receive and transmit data that runs in CPU cores bound to the hardware queues.

Specifically, the multi-core processor system 1 includes a resource management center 13.

The resource management center 13 is configured to obtain a network interface card allocation request of the operating system that runs in the first CPU core, where the network interface card allocation request is used to request to allocate a network interface card that can provide a network service, and the network interface card allocation request includes a network parameter of the network service required by the operating system.

The resource management center 13 is further configured to select, from M physical network interface cards and based on the network parameter of the network service required by the operating system, a target physical network interface card that conforms to the network parameter.

The resource management center 13 is further configured to separately select at least one target hardware queue from each target physical network interface card.

The resource management center 13 is further configured to send a command message to the network interface card controller 122, where the command message includes a queue identifier ID of each target hardware queue.

The network interface card controller 122 is configured to bind, according to the command message, interrupt routing of each target hardware queue to the first CPU core in which the operating system runs.

The network interface card controller 122 is further configured to search queue information of each target hardware queue according to the queue identifier ID of the target hardware queue.

The resource management center 13 is further configured to receive the queue information that is of the target hardware queue and fed back by the network interface card controller 122.

The resource management center 13 is further configured to send an instruction message to the CPU controller 111 on the CPU board 11, where the instruction message includes the queue information of the target hardware queue and network interface card information that are used to construct a virtual network interface card.

The CPU controller 111 on the CPU board 11 is configured to generate, according to the queue information of the target hardware queue and the network interface card information that are in the foregoing instruction message, a virtual network interface card that can provide the network service for the operating system.

Optionally, the foregoing network parameter of the network service required by the operating system includes at least a network segment connected by the network service and bandwidth required by the network service.

Optionally, the resource management center 13 is specifically configured to:

select, from a preconfigured first database and based on the network segment connected by the network service required by the operating system, a network interface card ID of a target physical network interface card 121 that matches the network segment, where the first database stores a network interface card parameter of each physical network interface card 121 in the M physical network interface cards 121, and the network interface card parameter includes a network segment to which the physical network interface card 121 belongs and a network interface card ID of the physical network interface card 121.

Optionally, the resource management center 13 is specifically configured to:

search, according to the foregoing network interface card ID of the target physical network interface card 121, a preconfigured second database for queue information of each hardware queue in the target physical network interface card 121, where the second database stores queue information of each hardware queue in each physical network interface card 121 in the M physical network interface cards 121; and select, according to the bandwidth required by the network service, the at least one target hardware queue from each target physical network interface card 121, and obtain a queue ID of each target hardware queue from the queue information of all the hardware queues in each physical network interface card 121.

Optionally, the resource management center 13 is further configured to:

receive the network interface card parameter of each physical network interface card 121 in the M physical network interface cards 121, and the queue information of a hardware queue in each physical network interface card 121 in the M physical network interface cards 121, where the network interface card parameter and the queue information are sent by the network interface card controller 122;

allocate a corresponding network interface card ID to each physical network interface card 121 in the M physical network interface cards 121; and correspondingly store, in the first database, the network interface card parameter of each physical network interface card 121 and the network interface card ID of each physical network interface card 121 in the M physical network interface cards 121, and correspondingly store, in the second database, the queue information of a hardware queue in each physical network interface card 121 and the network interface card ID of each physical network interface card 121.

Optionally, the foregoing queue information of a hardware queue includes a queue ID of the hardware queue, a CPU core address bound to the interrupt routing, a direct memory access DMA mapping address, and a current status of the hardware queue, and the foregoing current status of the hardware queue indicates whether the hardware queue is allocated.

According to the multi-core processor system provided in this embodiment of the present invention, a resource management center obtains a network interface card allocation request of an operating system that runs in a first CPU core, selects, from M physical network interface cards and based on a network parameter of a network service required by the operating system, a target physical network interface card that conforms to the network parameter, and separately selects at least one target hardware queue from each target physical network interface card. Then the resource management center sends a command message to a network interface card controller and receives queue information that is of the target hardware queue and fed back by the network interface card controller. Finally, the resource management center sends an instruction message to a CPU controller on a CPU board, so that the CPU controller generates, according to the network interface card information and the target hardware queues, a new virtual network interface card that can provide the required network service for the operating system that runs on the CPU board. A multi-queue virtual network interface card that crosses physical network interface cards can be flexibly configured according to an operating system requirement. As a result, cross-network segment and cross-network interface card data processing are implemented, resources of multiple network segments and multiple network interface cards are fully used, and resource utilization is improved.

It may be clearly understood by a person skilled in the art that, for the purpose of convenient and brief description, division of the foregoing function modules is taken as an example for illustration. In actual application, the foregoing functions can be allocated to different function modules and implemented according to a requirement, that is, an inner structure of an apparatus is divided into different function modules to implement all or some of the functions described above. For a detailed working process of the foregoing system and module, reference may be made to a corresponding process in the foregoing method embodiments, and details are not described herein again.

In the several embodiments provided in the present application, it should be understood that the disclosed system and method may be implemented in other manners. For example, the described system embodiment is merely an example. For example, the module division is merely logical function division and may be other division in actual implementation. For example, a plurality of modules or components may be combined or integrated into another system, or some features may be ignored or not performed. In addition, the displayed or discussed mutual couplings or direct couplings or communication connections may be implemented through some interfaces. The indirect couplings or communication connections between the modules may be implemented in electronic, mechanical, or other forms.

In addition, functional modules in this application may be integrated into one processing module, or each of the modules may exist alone physically, or two or more modules are integrated into one module. The integrated module may be implemented in a form of hardware, or may be implemented in a form of a software functional module. According to the foregoing description, the foregoing embodiments are merely intended for describing the technical solutions rather than limiting the present disclosure.

What is claimed is:

1. A network interface card configuration method for use in a multi-core processor system, wherein the multi-core processor system comprises a resource management center, a device board, and a central processing unit (CPU) board, the device board comprises M physical network interface cards and a network interface card controller configured to control the M physical network interface cards, the CPU board comprises multiple CPU cores and a CPU controller configured to control the CPU cores on the CPU board, wherein an operating system runs in a first CPU core among the multiple CPU cores, each physical network interface card comprises multiple hardware queues, and the hardware queues are used to receive and transmit data that runs in CPU cores bound to the hardware queues, the method comprising:

obtaining, by the resource management center, a network interface card allocation request of the operating system that runs in the first CPU core, wherein the network interface card allocation request is used to request to allocate a network interface card that can provide a network service, and the network interface card allocation request comprises a network parameter of the network service required by the operating system;

selecting, from the M physical network interface cards and based on the network parameter of the network service required by the operating system, a target physical network interface card that conforms to the network parameter;

separately selecting at least one target hardware queue from each target physical network interface card;

sending a command message to the network interface card controller, wherein the command message is used to instruct the network interface card controller to bind interrupt routing of each target hardware queue to the first CPU core in which the operating system runs, and the command message comprises a queue identifier ID of each target hardware queue;

receiving queue information that is of each target hardware queue and fed back by the network interface card controller according to the queue identifier ID of the target hardware queue; and sending an instruction message to the CPU controller on the CPU board to instruct the CPU controller on the CPU board to generate, according to network interface card information and the queue information of the target hardware queue, a virtual network interface card that can provide the network service for the operating system, wherein the instruction message comprises the queue information of the target hardware queue and the network interface card information.

2. The method according to claim 1, wherein the network parameter of the network service required by the operating system comprises at least a network segment connected by the network service and bandwidth required by the network service.

3. The method according to claim 2, wherein selecting, from the M physical network interface cards and based on the network parameter of the network service required by the operating system, a target physical network interface card that conforms to the network parameter comprises:

selecting, from a preconfigured first database and based on the network segment connected by the network service required by the operating system, a network interface card ID of a target physical network interface card that matches the network segment, wherein the first database stores a network interface card parameter of each physical network interface card in the M physical network interface cards, and the network interface card parameter comprises a network segment to which the physical network interface card belongs and a network interface card ID of the physical network interface card.

4. The method according to claim 3, wherein separately selecting at least one target hardware queue from each target physical network interface card comprises:

searching, according to the network interface card ID of the target physical network interface card, a preconfigured second database for queue information of each hardware queue in the target physical network interface card, wherein the second database stores queue information of each hardware queue in each physical network interface card in the M physical network interface cards; and selecting, according to the bandwidth required by the network service, the at least one target hardware queue from each target physical network interface card, and obtaining a queue ID of each target hardware queue from the queue information of all the hardware queues in each physical network interface card.

5. The method according to claim 1, wherein before obtaining, by the resource management center, a network interface card allocation request of the operating system that runs on the CPU board, the method further comprises:

receiving the network interface card parameter of each physical network interface card in the M physical network interface cards, and the queue information of a hardware queue in each physical network interface card in the M physical network interface cards, wherein the network interface card parameter and the queue information are sent by the network interface card controller;

allocating a corresponding network interface card ID to each physical network interface card in the M physical network interface cards; and storing, in the first database, the network interface card parameter of each physical network interface card and the network interface card ID of each physical network interface card in the M physical network interface cards, and correspondingly storing, in the second database, the queue information of a hardware queue in each physical network interface card and the network interface card ID of each physical network interface card.

6. The method according to claim 1, wherein the queue information of a hardware queue comprises a queue ID of the hardware queue, a CPU core address bound to the interrupt routing, a direct memory access DMA mapping address, and a current status of the hardware queue, and the current status of the hardware queue is used to indicate whether the hardware queue is allocated.

7. A resource management center, comprising:
a communications interface, configured to communicate with a device board and a central processing unit (CPU) board, wherein the device board comprises M physical network interface cards and a network interface card controller configured to control the M physical network interface cards, each physical network interface card comprises multiple hardware queues, the hardware queues are used to receive and transmit data that runs in CPU cores bound to the hardware queues, and wherein the CPU board comprises multiple CPU cores and a CPU controller configured to control the CPU cores on the CPU board, wherein an operating system runs in a first CPU core among the multiple CPU cores; and
a processor coupled to the communications interface and configured to:
 obtain a network interface card allocation request of the operating system that runs in the first CPU core, wherein the network interface card allocation request is used to request to allocate a network interface card that can provide a network service, and the network interface card allocation request comprises a network parameter of the network service required by the operating system,
 select, from the M physical network interface cards and based on the network parameter of the network service required by the operating system, a target physical network interface card that conforms to the network parameter,
 separately select at least one target hardware queue from each target physical network interface card,
 send a command message to the network interface card controller, wherein the command message is used to instruct the network interface card controller to bind interrupt routing of each target hardware queue to the first CPU core in which the operating system runs, and the command message comprises a queue identifier (ID) of each target hardware queue,
 receive queue information that is of each target hardware queue and fed back by the network interface card controller according to the queue identifier ID of the target hardware queue, and
 send an instruction message to the CPU controller on the CPU board to instruct the CPU controller on the CPU board to generate, according to the network interface card information and the queue information of the target hardware queue, a virtual network interface card that can provide the network service for the operating system, wherein the instruction message comprises the queue information of the target hardware queue and the network interface card information.

8. The resource management center according to the claim 7, wherein the network parameter of the network service required by the operating system comprises at least a network segment connected by the network service and bandwidth required by the network service.

9. The resource management center according to claim 8, wherein the processor is configured to:
select, from a preconfigured first database and based on the network segment connected by the network service required by the operating system, a network interface card ID of a target physical network interface card that matches the network segment, wherein the first database stores a network interface card parameter of each physical network interface card in the M physical network interface cards, and the network interface card parameter comprises a network segment to which the physical network interface card belongs and a network interface card ID of the physical network interface card.

10. The resource management center according to claim 9, wherein the processor is configured to:
search, according to the network interface card ID of the target physical network interface card, a preconfigured second database for queue information of each hardware queue in the target physical network interface card, wherein the second database stores queue information of each hardware queue in each physical network interface card in the M physical network interface cards; and
select, according to the bandwidth required by the network service, the at least one target hardware queue from each target physical network interface card, and obtain a queue ID of each target hardware queue from the queue information of all the hardware queues in each physical network interface card.

11. The resource management center according to claim 7, wherein the processor is further configured to:
receive the network interface card parameter of each physical network interface card in the M physical network interface cards, and the queue information of a hardware queue in each physical network interface card in the M physical network interface cards, wherein the network interface card parameter and the queue information are sent by the network interface card controller;
allocate a corresponding network interface card ID to each physical network interface card in the M physical network interface cards; and
store, in the first database, the network interface card parameter of each physical network interface card and the network interface card ID of each physical network interface card in the M physical network interface cards, and correspondingly storing, in the second database, the queue information of a hardware queue in each physical network interface card and the network interface card ID of each physical network interface card.

12. The resource management center according to claim 7, wherein the queue information of a hardware queue comprises a queue ID of the hardware queue, a CPU core address bound to the interrupt routing, a direct memory access DMA mapping address, and a current status of the hardware queue, and the current status of the hardware queue is used to indicate whether the hardware queue is allocated.

13. A multi-core processor system comprising:
a device board comprising M physical network interface cards and a network interface card controller configured to control the M physical network interface cards;
a central processing unit (CPU) board comprising multiple CPU cores and a CPU controller configured to control the CPU cores on the CPU board, wherein an operating system runs in a first CPU core among the multiple CPU cores, and wherein each physical network interface card comprises multiple hardware queues, and the hardware queues are used to receive and transmit data that runs in CPU cores bound to the hardware queues; and a resource management center configured to:
obtain a network interface card allocation request of the operating system that runs in the first CPU core, wherein the network interface card allocation request is used to request to allocate a network interface card that can provide a network service, and the network interface card allocation request comprises a network parameter of the network service required by the operating system, select, from the M physical network interface cards and based on the network parameter of the network service required by the operating system, a target physical network interface card that conforms to the network parameter, and separately select at least one target hardware queue from each target physical network interface card, and send a command message to the network interface card controller, wherein the command message comprises a queue identifier ID of each target hardware queue;

wherein the network interface card controller is configured to:
bind, according to the command message, interrupt routing of each target hardware queue to the first CPU core in which the operating system runs, and
search queue information of each target hardware queue according to the queue identifier ID of the target hardware queue; and the resource management center is further configured to:
receive the queue information that is of the target hardware queue and fed back by the network interface card controller, and
send an instruction message to the CPU controller on the CPU board, wherein the instruction message comprises the queue information of the target hardware queue and network interface card information that are used to construct a virtual network interface card; and the CPU controller on the CPU board is configured to generate, according to the queue information of the target hardware queue and the network interface card information that are in the instruction message, a virtual network interface card that can provide the network service for the operating system.

14. The multi-core processor system according to claim 13, wherein the network parameter of the network service required by the operating system comprises at least a network segment connected by the network service and bandwidth required by the network service.

15. The multi-core processor system according to claim 14, wherein the resource management center is configured to:

select, from a preconfigured first database and based on the network segment connected by the network service required by the operating system, a network interface card ID of a target physical network interface card that matches the network segment, wherein the first database stores a network interface card parameter of each physical network interface card in the M physical network interface cards, and the network interface card parameter comprises a network segment to which the physical network interface card belongs and a network interface card ID of the physical network interface card.

16. The multi-core processor system according to claim 15, wherein the resource management center is configured to:

search, according to the network interface card ID of the target physical network interface card, a preconfigured second database for queue information of each hardware queue in the target physical network interface card, wherein the second database stores queue information of each hardware queue in each physical network interface card in the M physical network interface cards; and select, according to the bandwidth required by the network service, the at least one target hardware queue from each target physical network interface card, and obtain a queue ID of each target hardware queue from the queue information of all the hardware queues in each physical network interface card.

17. The multi-core processor system according to claim 13, wherein the resource management center is further configured to:

receive the network interface card parameter of each physical network interface card in the M physical network interface cards, and the queue information of a hardware queue in each physical network interface card in the M physical network interface cards, wherein the network interface card parameter and the queue information are sent by the network interface card controller;

allocate a corresponding network interface card ID to each physical network interface card in the M physical network interface cards; and correspondingly store, in the first database, the network interface card parameter of each physical network interface card and the network interface card ID of each physical network interface card in the M physical network interface cards, and correspondingly store, in the second database, the queue information of a hardware queue in each physical network interface card and the network interface card ID of each physical network interface card.

18. The multi-core processor system according to claim 13, wherein the queue information of a hardware queue comprises a queue ID of the hardware queue, a CPU core address bound to the interrupt routing, a direct memory access DMA mapping address, and a current status of the hardware queue, and the current status of the hardware queue is used to indicate whether the hardware queue is allocated.

* * * * *